(12) United States Patent
Chasman et al.

(10) Patent No.: US 7,047,259 B1
(45) Date of Patent: May 16, 2006

(54) RICH CROSS OBJECT NAVIGATION IN MOBILE APPLICATIONS

(75) Inventors: Doug Chasman, Sonora, CA (US); Joel Heinke, Livermore, CA (US); Jeff Parrett, Pleasanton, CA (US); Bruce Shay, Livermore, CA (US)

(73) Assignee: Oracle International Corporation, Redwood Shores, CA (US)

( * ) Notice: Subject to any disclaimer, the term of this patent is extended or adjusted under 35 U.S.C. 154(b) by 332 days.

(21) Appl. No.: 10/183,144

(22) Filed: Jun. 25, 2002

(51) Int. Cl.
*G06F 17/30* (2006.01)

(52) U.S. Cl. .................... 707/203; 707/10; 707/102

(58) Field of Classification Search ............. 707/1–10, 707/100–104.1, 200–205; 380/270; 345/740
See application file for complete search history.

(56) References Cited

U.S. PATENT DOCUMENTS

| | | | |
|---|---|---|---|
| 5,499,371 A | | 3/1996 | Henninger et al. |
| 5,694,598 A | | 12/1997 | Durand et al. |
| 5,710,922 A | | 1/1998 | Alley et al. |
| 5,729,735 A | * | 3/1998 | Meyering .................... 707/10 |
| 5,758,337 A | | 5/1998 | Hammond |
| 5,937,409 A | | 8/1999 | Wetherbee |
| 6,240,422 B1 | | 5/2001 | Atkins et al. |
| 6,317,754 B1 | * | 11/2001 | Peng .......................... 707/203 |
| 6,324,544 B1 | * | 11/2001 | Alam et al. ................. 707/201 |
| 6,539,381 B1 | * | 3/2003 | Prasad et al. ................. 707/10 |
| 6,633,924 B1 | * | 10/2003 | Wu et al. ................... 719/328 |
| 6,636,897 B1 | | 10/2003 | Sherman et al. |
| 6,674,445 B1 | | 1/2004 | Chithambaram et al. |
| 6,823,373 B1 | | 11/2004 | Pancha et al. |
| 6,862,617 B1 | * | 3/2005 | Wu ............................ 709/224 |
| 2001/0038824 A1 | | 11/2001 | Greenberg et al. |
| 2002/0033843 A1 | * | 3/2002 | Loos et al. .................. 345/740 |
| 2002/0057803 A1 | * | 5/2002 | Loos et al. .................. 380/270 |
| 2003/0004983 A1 | * | 1/2003 | Cohen ........................ 707/500 |
| 2003/0159136 A1 | | 8/2003 | Huang et al. |

OTHER PUBLICATIONS

U.S. Appl. No. 10/133,164, filed Apr. 2002, Chasman.*
U.S. Appl. No. 10/266,824, filed Oct. 2002, Caulfiled.*
U.S. Appl. No. 10/133,124, filed Apr. 2002, Chasman et al.*
U.S. Appl. No. 10/133,124, Doug Chasman, Simplified Application Object Synchronization for Optimized Data Storage, filed Apr. 25, 2002.
U.S. Appl. No. 10/133,164, Doug Chasman, System and Method for Synchronization of Version Annotated Objects, filed Apr. 25, 2002.

* cited by examiner

*Primary Examiner*—Mohammad Ali
(74) *Attorney, Agent, or Firm*—Townsend and Townsend and Crew LLP (57) ABSTRACT

A method for operating a software application on a mobile device while not maintaining a real-time connection to a server includes using a server to pre-calculate relationship values between object instances stored in an object store on the mobile device, communicating the pre-calculated values to the mobile device for storage in the object store, and using the pre-calculated values to navigate between object instances while the mobile device is not in communication with the server.

26 Claims, 8 Drawing Sheets

RICH CROSS OBJECT NAVIGATION IN MOBILE APPLICATIONS

BACKGROUND OF THE INVENTION

1. Field of the Invention

The present invention relates generally to the field of data distribution and storage, and more particularly to a method for allowing more efficient navigation between objects stored on a mobile device.

2. Description of the Prior Art

In networked computer systems data is commonly stored in a central location such as a collection of disk drives. In networked computer systems such as those commonly found in business offices, a network server includes a primary data storage system for the network, and the networked computers access files and other data from the network server to cache locally. Increasingly, mobile devices such as laptop computers, handheld computers, and Personal Digital Assistants (PDAs) are being linked to networked computer systems.

Figure 1:
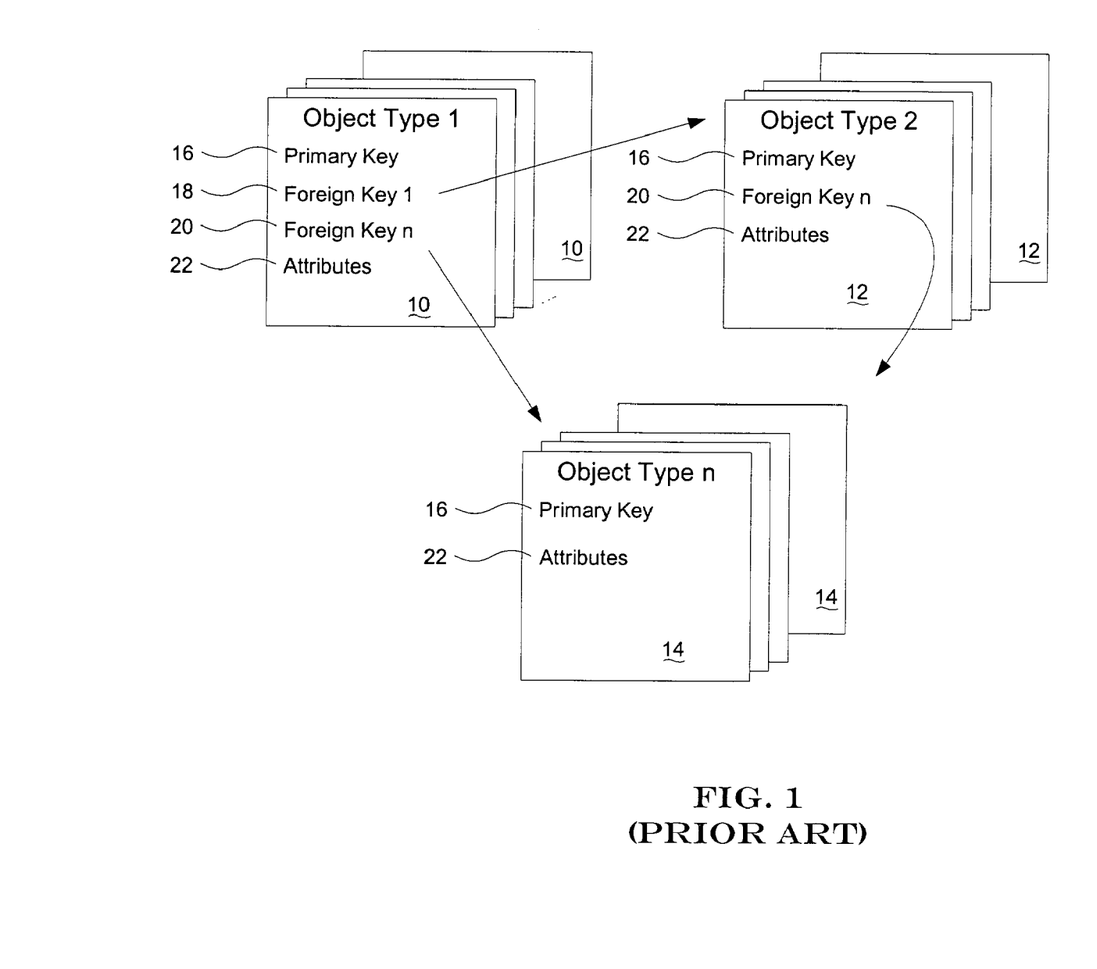
FIG. 1 shows data represented as objects in a database according to the prior art.

Application software developed to run on network servers typically represent and manipulate data in the form of objects where an object is a collection of data arranged in a particular manner. FIG. 1 represents multiple object types 10, 12, and 14, where each object type 10, 12, and 14 is specific to a particular type of data record. As shown, multiple object instances can exist for each object type. In a business context, for example, object types 10, 12, and 14 can include contact information for individuals, product information for companies, and sales records. Each object type 10, 12, and 14 will include a primary key 16 that is a field or a combination of multiple fields dedicated to a unique identifier. For an object type that represents data about customers, the primary key 16 could be a customer number that is unique to each customer. Each object type 10, 12, and 14 also includes fields for various attributes 22. For an object type that represents data about customers, for example, attributes 22 can include the number of years the customer has been a purchaser, the customer's field of business, and so forth.

Additional fields within an object type 10 and 12 can be used to relate together different object types 10, 12, and 14. In FIG. 1 object type 10 includes a first foreign key 18 that links object type 10 to object type 12, and a second foreign key 20 that links object type 10 to object type 14. Similarly, object type 12 is also linked to object type 14 by its foreign key 20. As can be seen from FIG. 1, an object type can include any number of foreign keys or no foreign keys. As with primary keys 16, a foreign key 18 and 20 is a field or a combination of fields dedicated to a unique identifier in the target object type.

Application software running on network servers typically store object instances of the type described above with reference to FIG. 1 in databases having a relational format. A relational database, being a database having a relational format, is one in which data are organized in tables, typically with each row dedicated to a unique record and each column dedicated to a particular type of attribute that is common to each record. Network servers commonly store numerous records in very large tables. When working with a relational database, a table join must be performed in order to find a foreign key that relates a particular instance of one object type to a particular instance of another object type. As is well known, table joins are computationally intensive, especially as table sizes become large. Network servers are typically optimized for processing speed over ease of mobility and are therefore enabled with sufficient processing power to be capable of rapidly performing such computationally intensive table joins.

Mobile devices, on the other hand, trade off processing power for small size, light weight, and low power consumption. To achieve these goals, mobile devices have very limited processing capabilities and storage capacities compared to network servers. Further, some mobile devices do not store data in a relational database but instead use a data structure that is better suited to a limited storage capacity. Consequently, performing large table joins is impractical on mobile devices.

In order to operate the same software application on a mobile device that is available on a network server therefore requires providing an additional source of computing power to the mobile device. This is commonly done by establishing a real-time communications link between the mobile device and a network server so that necessary table joins are computed by the network server which then communicates the results to the mobile device. The obvious disadvantage of this approach is that it requires a real-time communications link any time a user seeks to run the application.

Accordingly, what is needed is a way to operate an application on a mobile device and to provide the mobile device with necessary data regarding the relationships between stored object instances given the limitations of the mobile device computing power and without having to rely on a real-time connection to a network server.

SUMMARY

A method for providing an object relationship on a mobile device includes calculating the object relationship with a server, serializing the object relationship, communicating the object relationship to the mobile device, deserializing the object relationship, and storing the object relationship. By this method the computing power of the server is used to efficiently calculate the object relationship between two objects and provide that object relationship to the mobile device for later use. In such later use, an application running on the mobile device can navigate from any initial object instance to another object instance referenced by the initial object instance by following the object relationship. Accordingly, to obtain the object relationship, the mobile device neither needs to calculate the object relationship itself nor does the mobile device need a real-time connection to the server.

According to the method of the invention, calculating the object relationship includes transforming an object relationship in a first data format to the object relationship having a second data format. For example, the first data format can be the data format in which the object relationship is originally represented on the server, such as a relational data format. Thus, the object relationship in the first data format can be embodied in a foreign key. The second data format is the data format used to store object instances in the object store of the mobile device and can therefore be an object-like data format.

A method for accessing a referenced object in an object store includes storing in the object store a pre-computed relationship value that identifies a relationship of the referenced object to an initial object, accessing the initial object, accessing the pre-computed relationship value, and accessing the referenced object. Here, relationship values provided to the mobile device, for example by the prior method, can be the pre-computed relationship values. The pre-computed relationship value can be stored in an object-like format and can include an object type identifier and a unique identifier for the referenced object. By this method an application can access the initial object from the object store and display content included in the initial object through a user interface. The displayed content can include a link to a referenced object. When the link is selected the application is directed to access the pre-computed relationship value which explicitly identifies the referenced object to the initial object. The application can then use the pre-computed relationship value to find the referenced object in the object store and then display content included in the referenced object.

The invention also includes a computer-readable medium comprising program instructions for navigating an object store on a mobile device. The program instructions include procedures for receiving a pre-computed relationship value that identifies a relationship of a referenced object to an initial object, storing the pre-computed relationship value in the object store, accessing the initial object, accessing the pre-computed relationship value, and accessing the referenced object. Another method of the invention is for navigating an object store on a mobile device and includes means for calculating a relationship value that identifies a referenced object to an initial object, means for communicating the relationship value to the mobile device, means for storing the relationship value in the object store, means for accessing the initial object from the object store, and means for using the relationship value to access the referenced object.

The invention also includes a method for affecting a relational database, for example by uploading from a mobile device a new relationship for a pair of object instances already stored in the relational database. The method includes establishing a relationship between two objects stored in an object-like format, serializing the relationship, communicating the relationship to a server in communication with the relational database, deserializing the relationship, and storing the relationship within the relational database.

The invention also includes another method for affecting a relational database, for example by uploading from a mobile device a new object instance that was created on the mobile device. The method includes establishing in an object store an object with a temporary object ID, communicating the object to a server in communication with the relational database, assigning a non-temporary object ID to the object, and storing the object in the relational database. Establishing the object with the temporary object ID can include establishing object relationships that include the non-temporary object ID. The method can also include associating the non-temporary ID with the object in the object store so that the object in the object store is no longer identified by the temporary ID. The method also includes reconciliation of object relationships such that occurrences of the temporary ID are replaced with the non-temporary ID.

DETAILED DESCRIPTION OF THE INVENTION

The present invention provides a method for operating a software application on a mobile device without the need for a real-time connection to a network server. By this method the software application can display content through a user interface of the mobile device, where the content can include object instances stored in a resident object store on the mobile device. Pre-calculated values that are also stored in the object store identify the relationships between the various object instances. When a user, viewing an initial object instance through the user interface, selects a link in order to display a referenced object instance, the application software uses the pre-calculated value to efficiently find the selected instance.

Figure 2:
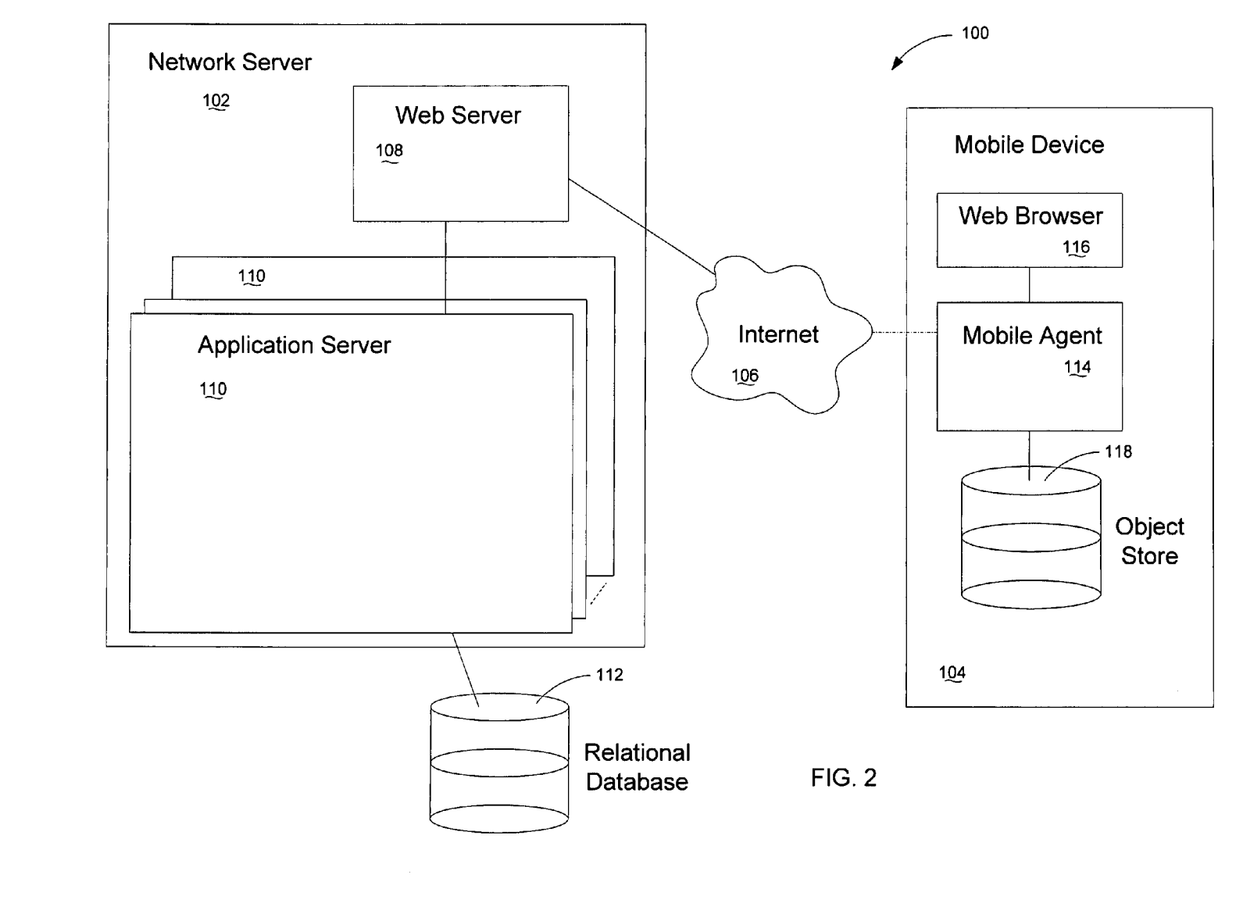
FIG. 2 is a network according to an embodiment of the invention.

To better set forth the invention, aspects of the supporting hardware will first be described in greater detail. FIG. 2 illustrates a system 100 including a network server 102 that can communicate with a mobile device 104 across a Local Area Network (LAN) or a Wide Area Network (WAN) such as the Internet 106. The network server 102 includes a web server 108 in communication with one or more application servers 110. In FIG. 2 a solid line is used to represent the communications link between the web server 108 and the Internet 106 to indicate that the link is continuously maintained. A dashed line is used to represent the communications link between the mobile device 104 and the Internet 106 to indicate that the link is temporary.

Each application server 110 may be a separate server, or may be a partition of a larger server such as an enterprise server, or may be distributed across several servers. Application software (not shown) running on the application server 110 is configured to represent and manipulate data in the form of objects and to store the objects in a relational database 112. The relational database 112 can be maintained, for example, on a dedicated storage device within the application server 110, a storage device shared by several application servers 110, a network attached storage device (NAS), a storage area network (SAN) connected to the application server 110, or a database stored on any of these devices.

Mobile device 104 includes a mobile agent 114, a web browser 116, and an object store 118. The mobile agent 114 runs application software (not shown) and displays resulting content with the web browser 116. The application software running on the mobile device 104 is configured to represent and manipulate data in the form of objects that are stored in the object store 118, preferably in a format optimized for the computing capabilities of the mobile device. All such optimized formats are collectively referred to herein as an object-like format. The mobile agent 114 is used to provide objects from the object store 118 to the web browser 116 and is also used to connect the object store 118 with the central computer system 102.

One aspect of the invention relates to a method for providing an object relationship on a mobile device, where an object relationship is a unique identifier for a referenced object instance. As one example of this method, the computing power of an application server 110 is leveraged to transform existing object relationships in an initial format that is optimized for the high computational power of the server, into object relationships in another format better suited to the limitations of a mobile device 104. The mobile device 104 receives the transformed object relationships from the application server 110 and stores them in an object store 118. At a later time, when the mobile device 104 is no longer in real-time communication with the application server 110, the mobile device 104 can run an application software which is enabled to efficiently access referenced object instances according to the stored object relationships.

Figure 3:
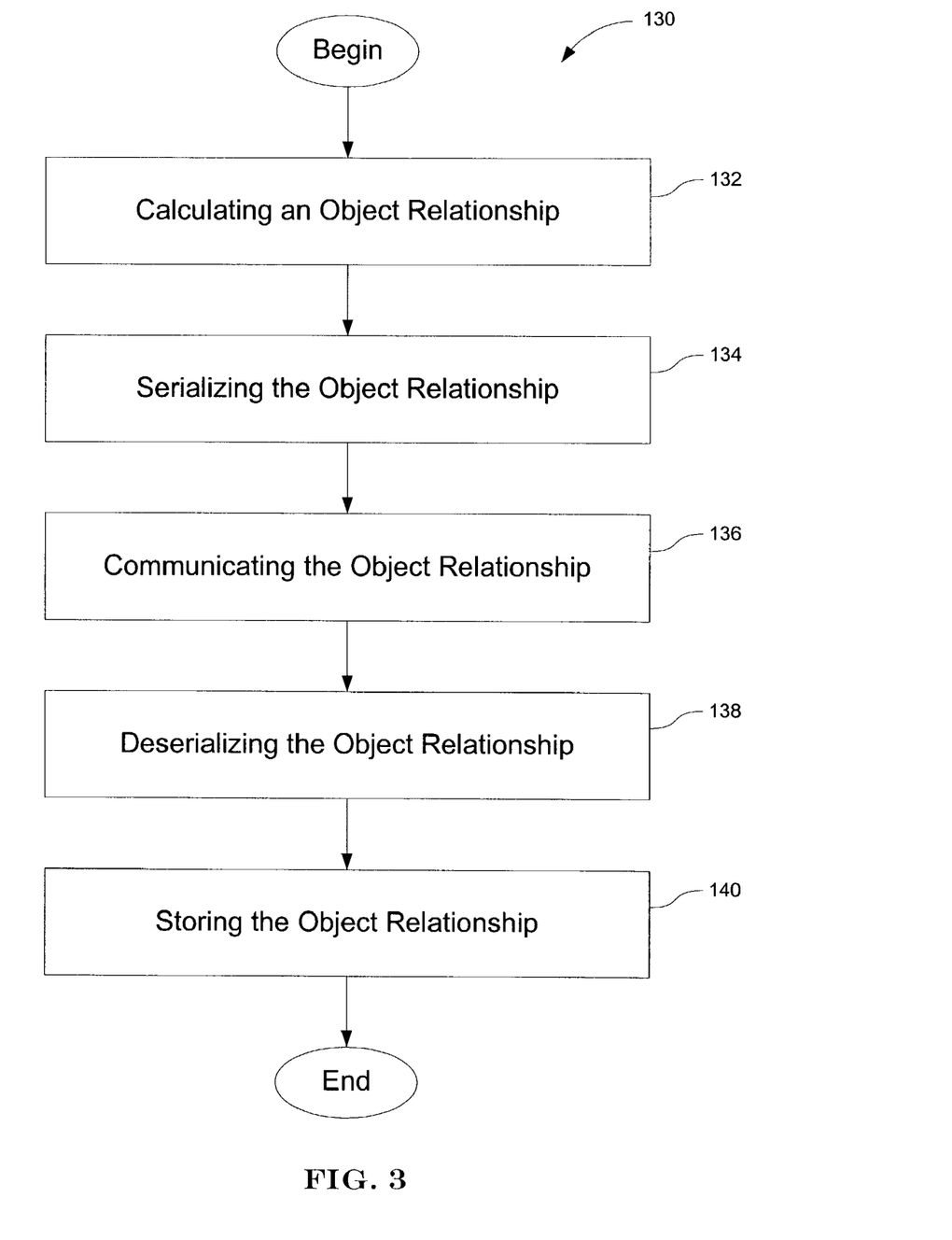
FIG. 3 is a flow chart showing an embodiment of a method the invention.

FIG. 3 illustrates this method 130 of the invention. The method 130 includes step 132 of calculating with a remotely connected server the object relationship, step 134 of serializing the object relationship, step 136 of communicating the object relationship to the mobile device, step 138 of deserializing the object relationship, and step 140 of storing the object relationship in an object-like format.

Step 132 provides for calculating the object relationship with a server such as application server 110. In some embodiments step 132 can therefore include a process of identifying relevant object instances between which object relationships are needed. Here, relevant object instances include an initial object instance and at least one object instance referenced by the initial instance. Relevant object instances can be determined during a synchronization between the mobile device 104 and the application server 110 as described in U.S. patent application Ser. No. 10/133,124 entitled "Simplified Application Object Synchronization for Optimized Data Storage," incorporated herein by reference in its entirety. It will be appreciated that in some embodiments the method 130 will be performed during a synchronization between the mobile device 104 and the application server 110.

Once relevant object instances have been identified, step 132 can determine an object relationship. In some embodiments the format of the database of the application server 110 is a relational format and the application server 110 determines object relationships by first determining the foreign keys that relate relevant object instances. Foreign keys are determined by performing table joins on the tables within the relational database 112 as described above in the Background of the Invention. Once the foreign keys that relate two object instances are determined, the application server 110 transforms these foreign keys into an object relationship in another format, such as an object-like format. In an object-like format each object relationship can be an object type identifier along with its unique identifier for a particular referenced object instance. The use of object type identifiers and unique identifiers is described in U.S. patent application Ser. No. 10/133,164 entitled "System and Method for Synchronization of Version Annotated Objects," incorporated herein by reference in its entirety. It will be appreciated that although the present example describes transforming an object relationship between a relational data structure and an object-like data structure, as is well known in the art, the present invention applies equally to transforming an object relationship between any two data structures.

Figure 4:
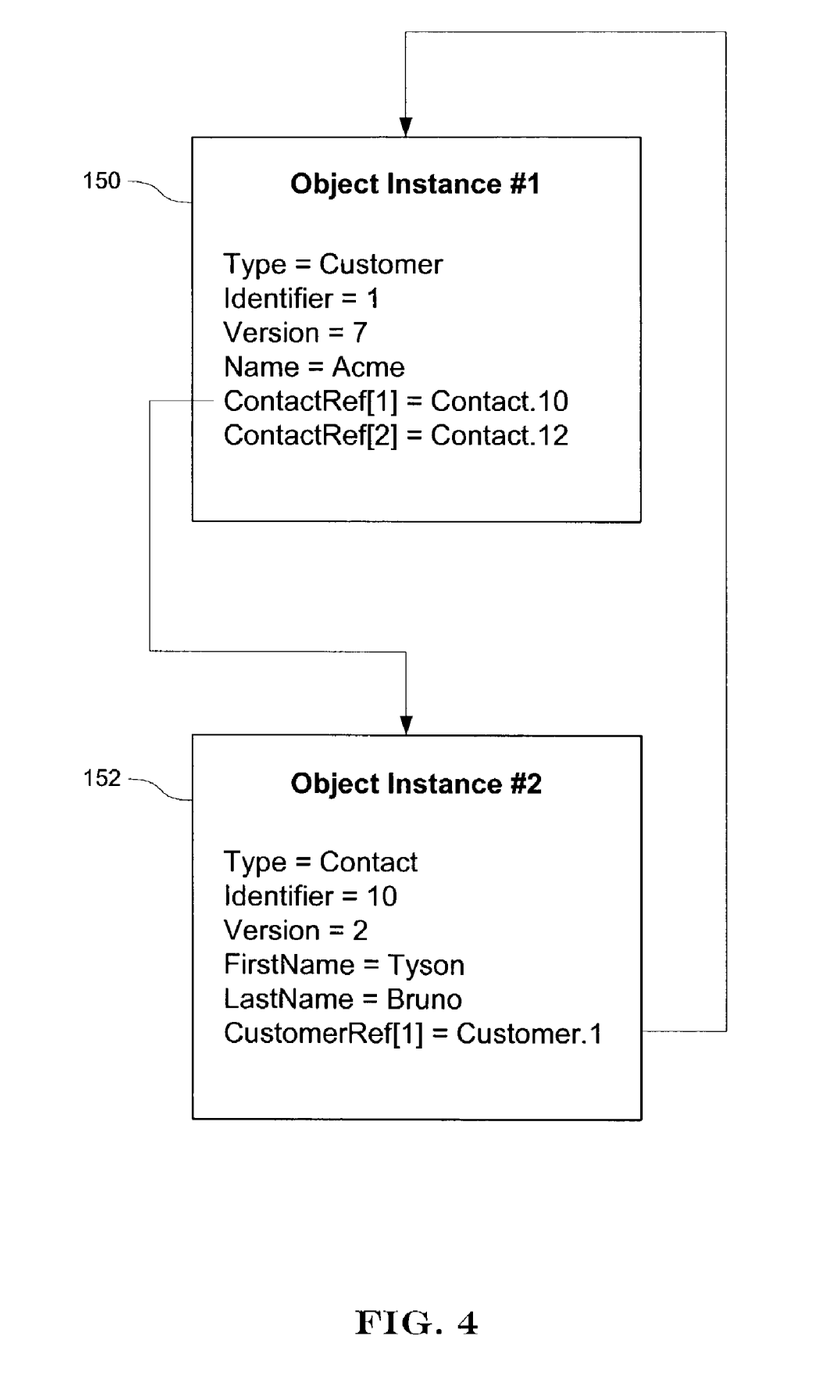
FIG. 4 shows two object instances that reference one another according to an embodiment of the invention.

FIG. 4 illustrates a pair of relevant object instances 150 and 152. Object instance 150 is of the "Customer" object type and has a unique identifier with an assigned value of 1. Object instance 152 is of the "Contact" object type and has a unique identifier with an assigned value of 10. Object instance 150 references two object instances of the "Contact" object type and includes object relationships for each. The first object relationship, ContactRef[1], identifies object instance 152 by its object type and unique identifier. The second object relationship, ContactRef[2], identifies an object instance (not shown) that has the same object type as object instance 152 but a different unique identifier. Similarly, object instance 152 references object instance 150 and includes an object relationship, CustomerRef[1], that identifies object instance 150 by its object type and unique identifier. As shown in FIG. 4, Step 132 of calculating the object relationship with a server can also include appending the object relationship to an object instance.

Step 134 provides for serializing the object relationship. Serializing includes flattening any hierarchical data structure and formatting the flattened data for communication. In those embodiments in which the object relationship is appended to an object instance, as shown in FIG. 4, serializing can include flattening the data structure of the object instance that includes the object relationship. Formatting the flattened data can include, for example, the use of a mark-up language such as Hyper-Text Markup Language (HTML) or Extensible Markup Language (XML).

Step 136 provides for communicating the object relationship to the mobile device 104. As shown in FIG. 2, communicating the object relationship from the application server 110 to the mobile device 104 can include communicating the object relationship from the application server 110 to a web server 108 that maintains a communications link to a network such as the Internet 106. Step 136 also can include connecting the mobile device 104 to the network and transmitting the object relationship over the network to be received by the mobile device 104. In some embodiments the serialized object relationship is received by a mobile agent 114 on the mobile device 104. In some embodiments step 136 is performed during a synchronization between the mobile device 104 and the application server 110 while preceding steps such as 132 and 134 can be performed prior to or at the time of synchronization:

Step 138 provides for deserializing the object relationship by the mobile device 104. Deserializing includes removing any formatting that was introduced for the purpose of communication. Deserializing also includes restoring any data structure that was previously flattened by the serialization of step 134. In the embodiment shown in FIG. 2, for example, deserialization is performed by the mobile agent 114.

Step 140 provides for storing the object relationship in an object-like format. In the embodiment shown in FIG. 2, for example, the mobile agent 114 stores the object relationship in the object store 118. In those embodiments in which the object relationship is appended to an object instance the object relationship is stored together with the object instance in the object-like format.

Figure 5:
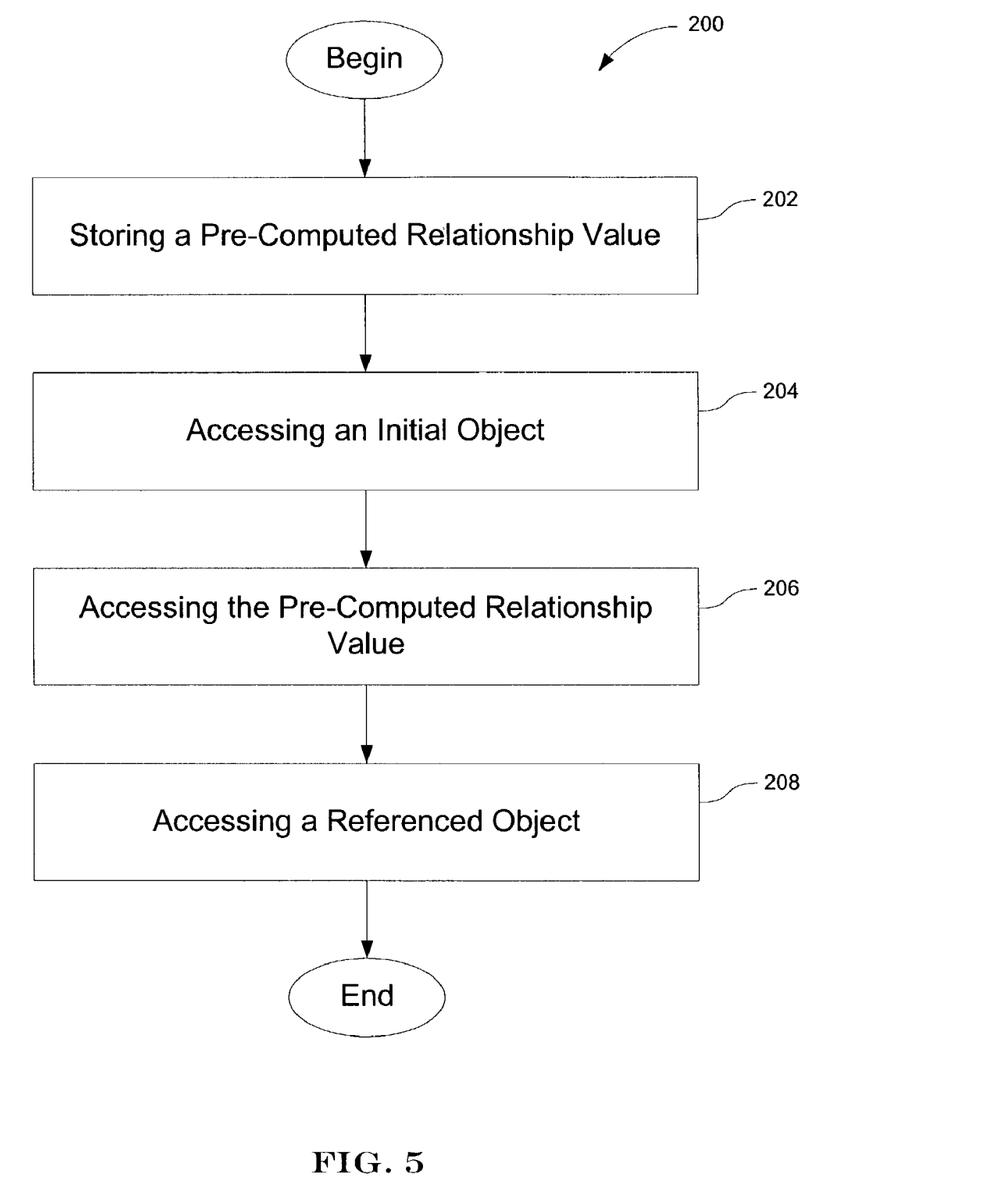
FIG. 5 is a flow chart showing an embodiment of another method the invention.

While method 130 is directed to calculating object relationships and providing them to a mobile device 104 for a later use, another aspect of the invention relates to a method for such later use by using those object relationships to access a referenced object from an object store. FIG. 5 illustrates this method 200 of the invention. The method 200 includes step 202 of storing in the object store a pre-computed relationship value that identifies a relationship of the referenced object to an initial object, step 204 of accessing the initial object, step 206 of accessing the pre-computed relationship value, and step 208 of accessing the referenced object.

Step 202 provides for storing in the object store 118 a pre-computed relationship value that identifies a relationship of the referenced object to an initial object. Here, a pre-computed relationship value that identifies the relationship of the referenced object to the initial object is essentially the same as the object relationship discussed above. In contrast to the previous method 130, however, the pre-computed relationship value of method 200 is not limited to being calculated by a server, and method 200, therefore, does not depend on how the pre-computed relationship value is determined. The pre-computed relationship value can be stored, for example, as an attribute of the initial object as shown in FIG. 4. Alternately, the pre-computed relationship value can be stored as a separate object.

Figure 6:
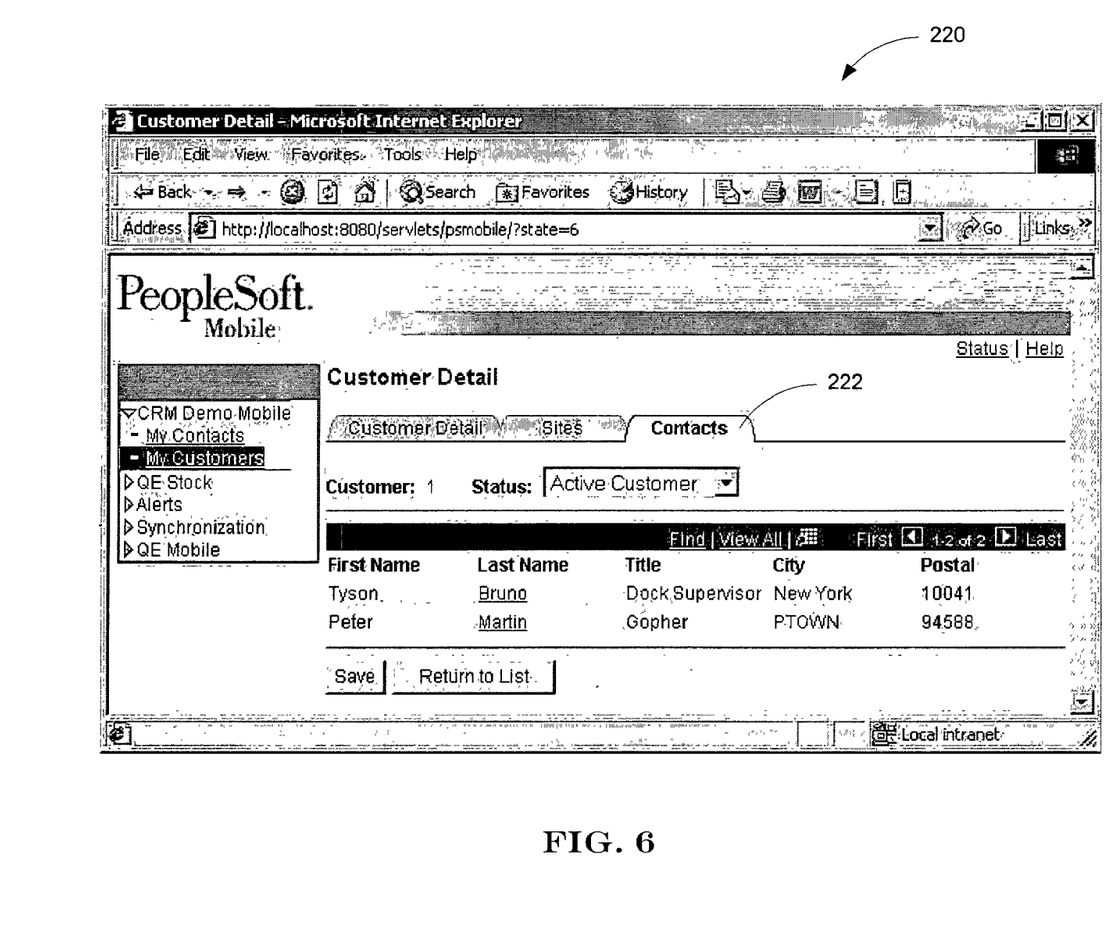
FIG. 6 shows a web browser display for a mobile device enabled by the present invention.

Step 204 provides for accessing the initial object. Application software running on the mobile device 104, for example, can access the initial object while displaying content through the web browser 116. FIG. 6 illustrates a web browser display 220 driven by application software. Essentially any object instance that is required by the application software can be thought of as the initial object within the context of method 200. In the example shown in FIG. 6 the content on the web browser is derived from an object of the "Customer" object type. Thus, for the purposes of the example in FIG. 6 the particular object instance of the "Customer" object type relating to Customer 1 will serve as the initial object.

Step 206 provides for accessing the pre-computed relationship value. In the example shown in FIG. 6, when a user selects the tab 222 labeled "Contacts" on the display 220, the application software can display a list of all of the contacts associated with Customer 1. In order to display the list, the application software must identify all of the object instances of the "Contact" object type that are referenced by the initial object, i.e. the object instance of the "Customer" object type for Customer 1. In those embodiments in which pre-computed relationship values are stored as attributes of the initial object, the application software accesses the pre-computed relationship value by searching the initial object for any pre-computed relationship values that include the desired object type identifier. The desired object identifier for the example shown in FIG. 6 is "Contact." Referring back to FIG. 4, if object instance 150 is an example of an initial object, it can be seen that it includes two pre-computed relationship values that have "Contact" as the object type identifier. Thus, in response to the request to display referenced objects of the "Contact" object type, the application software accesses two pre-computed relationship values from the initial object.

Step 208 provides for accessing the referenced object. This step can include having a user make a selection from a user interface on the mobile device 104 to direct the application software to a particular pre-computed relationship value. In the example shown in FIG. 4, the application software accesses the referenced object according to the pre-computed relationship value accessed in step 206. In those embodiments in which the pre-computed relationship value is set forth as an object type combined with a unique identifier, the application software accesses the referenced object by searching the object store 118 for the object instance of the specified object type with the specified unique identifier. Once the referenced object instance has been found in the object store 118 the application software can display or modify its contents.

Figure 7:
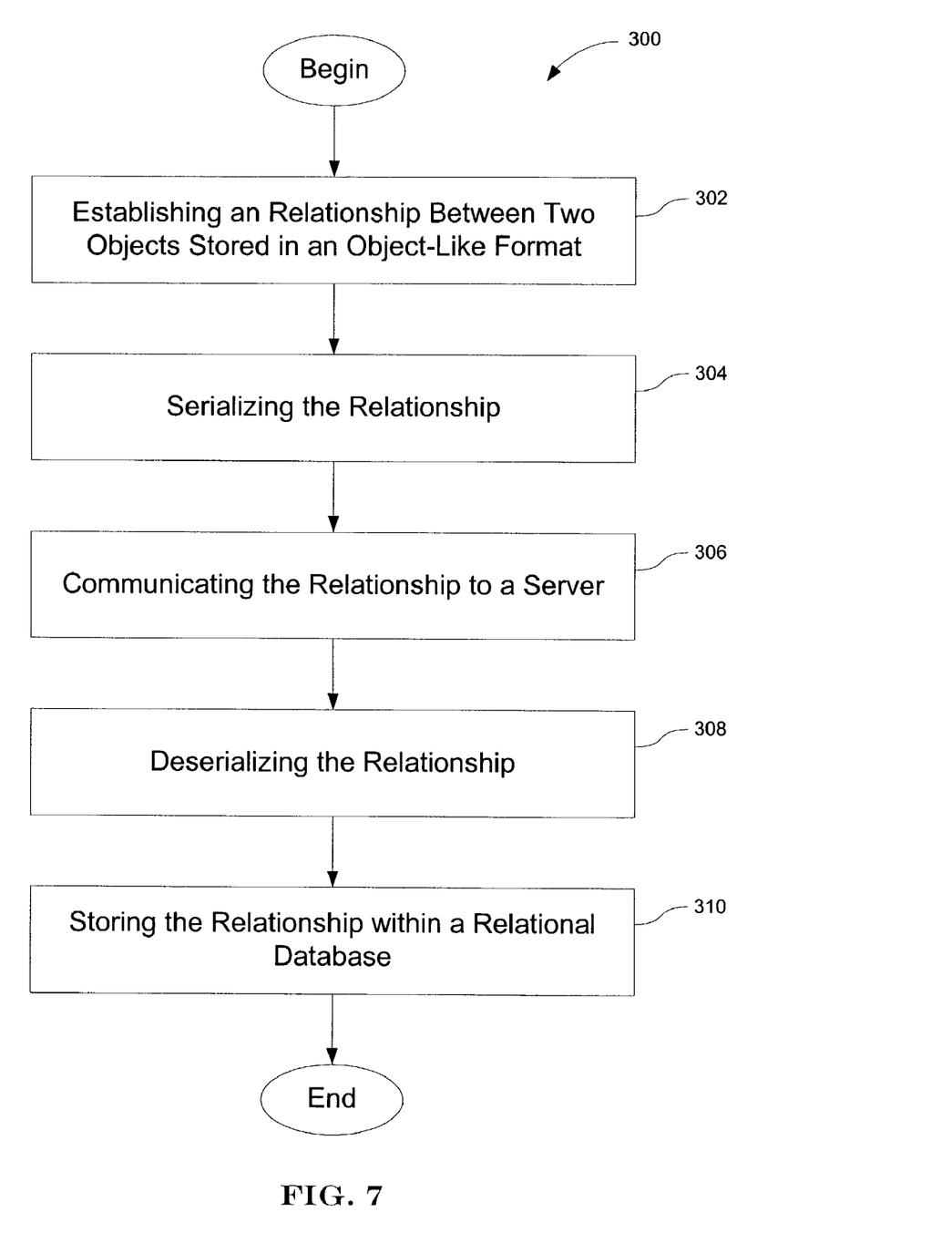
FIG. 7 is a flow chart showing an embodiment of still another method the invention.

Yet another aspect of the invention relates to a method for affecting a relational database 112, for example, by uploading to the relational database 112 from the object store 118 of the mobile device 104 new or different relationships between existing object instances. FIG. 7 illustrates this method 300 of the invention. Method 300 includes the step 302 of establishing a relationship between two objects stored in an object-like format, step 304 of serializing the relationship, step 306 of communicating the relationship to a server in communication with the relational database, step 308 of deserializing the relationship, and step 310 of storing the relationship within the relational database.

Step 302 provides for establishing a relationship between two objects stored in an object-like format. Here, the relationship between two objects stored in an object-like format is essentially the same as the object relationship discussed above, however, in contrast to the previous method 130, the relationship is not calculated by a server. Referring back to FIG. 6, the application software rendering the content on the web browser 116 can preferably include editing functions to allow a user to make changes to the content. For example, in response to learning that a particular contact has switched jobs from a first customer to a second customer, the user can delete the association between that contact and the first customer and reassign the contact to the second customer.

In the above example the editing function of the application software establishes a relationship between two object instances, the object instance of the "Contact" object type for the particular contact, and the object instance of the "Customer" object type for the second customer. Within the present context, establishing a relationship also includes the process of disestablishing a relationship, as when the object instance of the "Contact" object type for the particular contact is disassociated from the object instance of the "Customer" object type for the first customer. In some embodiments the relationship is expressed as an object type combined with a unique identifier, where the object type is the object type of one of the two object instances and the unique identifier is the unique identifier for that instance. In further embodiments the relationship is appended to the other of the two object instances. In addition to establishing the relationship from one of the two object instances to the other, a second relationship can be established from the second object instance to the first object instance in a similar fashion.

Step 304 provides for serializing the relationship and is essentially the same process as described above with respect to step 134. Here, however, the serialization is preferably performed by the mobile device 104 and more preferably by the mobile agent 114.

Step 306 provides for communicating the relationship to a server in communication with the relational database. This step is essentially the same process as described above with respect to step 136 except that the communication is in the opposite direction. Thus, the process of formatting with a mark-up language, for example, is preferably performed by the mobile device 104 and more preferably by the mobile agent 114. Here, the server that receives the serialized relationship can be the network server 102, for example, which happens to be in communication with relational database 112.

Step 308 provides for deserializing the relationship and is essentially the same process as described above with respect to step 138. Here, however, the deserialization is preferably performed by the network server 102 and more preferably by either the web server 108 or the application server 110.

Step 310 provides for storing the relationship within the relational database, such as relational database 112. This step includes transforming the relationship to a data format that is suitable for the relational database, such as foreign keys. In some embodiments this includes transforming an object type identifier and a unique identifier into foreign keys and storing the foreign keys in an appropriate location, such as columns in tables, within the relational database.

Figure 8:
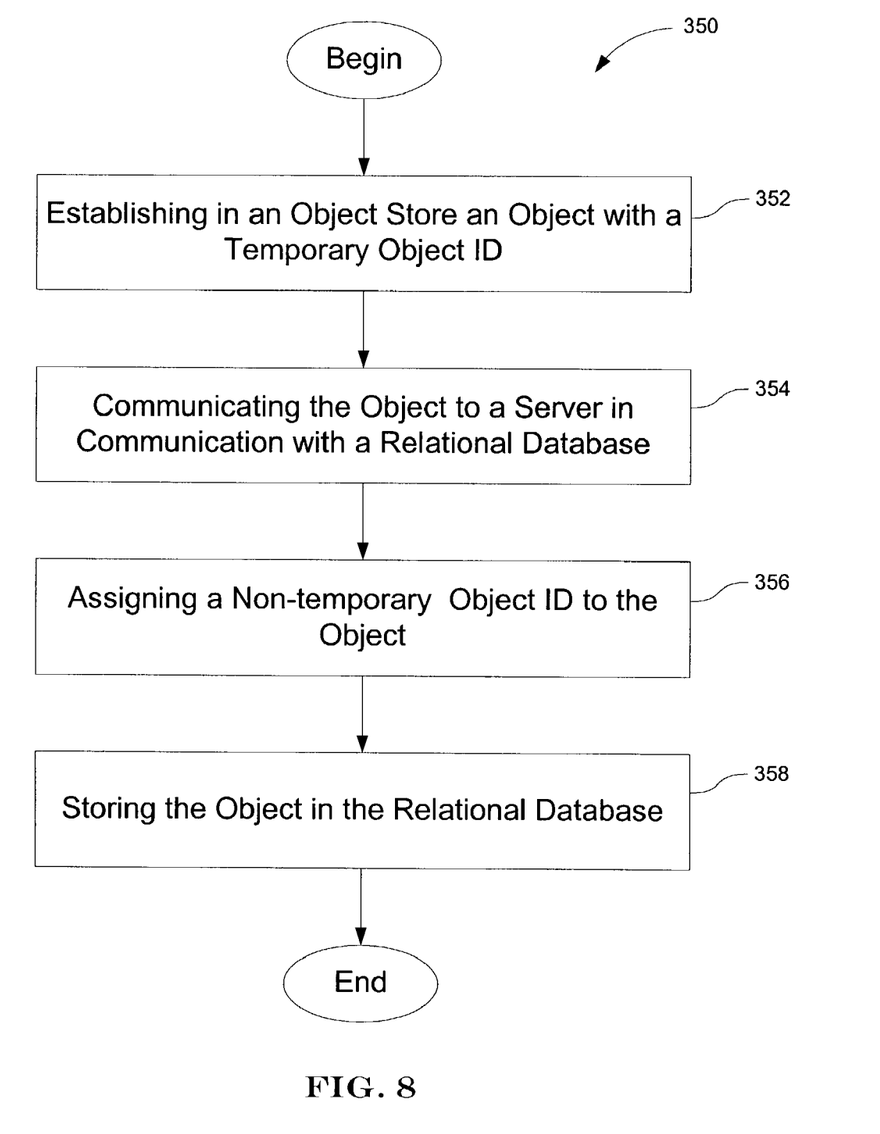
FIG. 8 is a flow chart showing an embodiment of yet another method the invention.

Still another aspect of the invention relates to a method for affecting a relational database 112, for example, by adding new data uploaded from a mobile device 104. FIG. 8 illustrates this method 350 of the invention. The method 350 includes the step 352 of establishing in an object store an object with a temporary object ID, the step 354 of communicating the object to a server in communication with the relational database, the step 356 of assigning a non-temporary object ID to the object, and the step 358 of storing the object in the relational database.

The step 352 provides for establishing an object with a temporary object ID in an object store, such as object store 118. The object is preferably established in an object-like format. In some embodiments the temporary object ID includes an object type identifier and a unique identifier, and in further embodiments a negative value is used to designate the temporary object ID as temporary. A newly created object can reference other objects in the object store 118 and, likewise, can itself be referenced by other objects. Where another object references the newly created object, the relationship can be represented by an object relationship that includes the temporary object ID. Thus, step 352 can include establishing a second object in the object store, and establishing an object relationship including the temporary object ID that identifies a relationship between the newly created object and the second object.

The step 354 provides for communicating the object to a server in communication with the relational database. In some embodiments this is performed during a synchronization between the mobile device 104 and the network server 102. Communicating the object to the server can include serializing the object, transmitting the serialized object to the server, and deserializing the object. The object is serialized as described above, in some embodiments by the mobile agent 114. Transmitting the serialized object to the server also proceeds across a network, as described above, and can include receiving the serialized object at a web server 108 or an application server 110. In some embodiments the web server 108 or the application server 110 performs the deserialization, also as described above.

Step 356 provides for assigning a non-temporary object ID to the object, which may be performed by either the web server 108 or the application server 110. Step 358 provides for storing the object in the relational database 112. Step 358 can also include transforming the object to data in a relational format and storing the data in a relational database 112.

Once the non-temporary object ID has been assigned to the object, the non-temporary object ID can be communicated back to the copy of the object in the object store 118 so that the non-temporary object ID replaces the temporary one. In some embodiments the entire object including the non-temporary object ID is communicated to the object store 118 to replace the copy with the temporary object ID. In further embodiments, where there is the object relationship including the temporary object ID that identifies the relationship between the newly created object and the second object, the object relationship is updated so that the temporary ID is replaced with the non-temporary ID.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A method for accessing a referenced object in an object store, comprising:

storing in the object store a pre-computed relationship value for an initial object, wherein a processor performs one or more computations that are necessary to determine a first relationship between the initial object and a referenced object in a first data format of a first data structure, wherein the pre-computed relationship value is determined based on the first relationship of the initial object to the referenced object, the pre-computed relationship value indicating a second relationship between the initial object and the referenced object in a second data format for a second data structure;

accessing the initial object;

accessing the pre-computed relationship value associated with the initial object; and accessing the referenced object in the second data structure, wherein the referenced object is accessed using the second relationship defined by the pre-computed relationship value, wherein the pre-computed relationship value uniquely identifies the referenced object and allows the referenced object to be directly accessed in the second data format in the second data structure without performing the one or more computations that are necessary to determine the first relationship between the initial object and the referenced object in the first data format.

2. The method of claim 1 further comprising using a user interface to display the referenced object.

3. The method of claim 2 wherein the user interface is on a mobile device.

4. The method of claim 1, wherein the pre-computed relationship value is calculated from a relational database.

5. The method of claim 4, wherein the pre-computed relationship value is communicated to the object store.

6. The method of claim 4, wherein the processor is a server.

7. The method of claim 1, wherein the second format is an object-like format.

8. The method of claim 1, wherein the object store is resident on a mobile device.

9. The method of claim 1, wherein the pre-computed relationship value includes an object type identifier and a unique identifier for the referenced object.

10. The method of claim 1, wherein accessing the pre-computed relationship value includes selecting the referenced object to be displayed on a user interface.

11. The method of claim 10, wherein the referenced object is selected from a list of objects referenced by the initial object.

12. The method of claim 1, wherein accessing the referenced object includes using the pre-computed relationship value to find the referenced object in the object store.

13. The method of claim 12, wherein accessing the referenced object further includes displaying the referenced object with a user interface.

14. A method for navigating an object store on a mobile device, comprising:

calculating a relationship value for an initial object, the relationship value being calculated by performing one or more computations that are necessary to determine a first relationship between the initial object and a referenced object in a first data format of a first data structure, wherein the relationship value is determined based on the first relationship of the initial object to the referenced object, the relationship value indicating a second relationship between the initial object and the referenced object in a second data format for a second data structure;

communicating the relationship value to the mobile device;

storing the relationship value in the object store;

accessing the initial object in the object store; and using the relationship value to access the referenced object in the second data structure, wherein the referenced object is accessed using the second relationship defined by the relationship value, wherein the relationship value uniquely identifies the referenced object and allows the referenced object to be directly accessed in the second data format in the second data structure without performing the one or more computations that are necessary to determine the first relationship between the initial object and the referenced object in the first data format.

15. A method for providing an object relationship on a mobile device, comprising:

calculating with a server the object relationship, the object relationship being calculated by performing one or more computations that are necessary to determine a first relationship between the initial object and a referenced object in a first data format of a first data structure, wherein the object relationship is determined based on the first relationship of the initial object to the referenced object, the object relationship being between the initial object and the referenced object in a second data format for a second data structure;

communicating the object relationship to the mobile device; and storing the object relationship in an object-like format in the second data structure, wherein the referenced object is accessible on the mobile device using the object relationship, wherein the object relationship uniquely identifies the referenced object and allows the referenced object to be directly accessed in the second data format in the second data structure without performing the one or more computations that are necessary to determine the first relationship between the initial object and the referenced object in the first data format.

16. The method of claim 15, wherein the first data format is a relational data format.

17. The method of claim 16, wherein the first relationship is a foreign key.

18. The method of claim 15, wherein communicating the object relationship to the mobile device is performed during a synchronization between the mobile device and the server.

19. The method of claim 15, wherein calculating with a server the object relationship is performed during a synchronization between the mobile device and the server.

20. A method for affecting a relational database, comprising:

establishing a relationship between a an initial object and a second referenced object stored in an object-like format, wherein the first relationship allows the referenced object to be accessed in the object-like format in a data structure;

communicating the first relationship to a server in communication with the relational database;

transforming the first relationship to a second relationship in a relational format for the relational database, the second relationship requiring one or more computations to be performed to determine the first relationship between the initial object and the referenced object in the object-like format, wherein the first relationship uniquely identifies the referenced object and allows the referenced object to be directly accessed from the initial object without performing the one or more computations that are necessary to determine the second relationship between the initial object and the referenced object in the relational format in the relational database; and storing the second relationship within the relational database.

21. A method for affecting a relational database, comprising:

establishing in an object store a first object with a temporary object ID, the object store being configured to store the first object in an object-like format;

determining an object relationship including the temporary object ID that identifies a relationship between the first object and a second object;

communicating the first object and the object relationship to a server in communication with the relational database;

assigning a non-temporary object ID to the first object; and transforming the object relationship to a second relationship in a relational format for the relational database, the second relationship requiring one or more computations to be performed to determine the object relationship between the first object and the second object in the object-like format, wherein the object relationship uniquely identifies the second object and allows the second object to be directly accessed from the first object without performing the one or more computations that are necessary to determine the second relationship between the first object and the second object in the relational format in the relational database; and storing the first object in the relational database.

22. The method of claim 21 wherein the temporary object ID is designated as temporary by a negative value.

23. The method of claim 21 further comprising associating the non-temporary ID with the first object in the object store.

24. The method of claim 23 further comprising:

wherein the object relationship includes the temporary object ID that that identifies the object relationship between the first object and the second object; the method further comprising:

replacing the temporary object ID with the non-temporary object ID within the object relationship.

25. A computer-readable medium comprising program instructions for navigating an object store on a mobile device, the program instructions including procedures for:

receiving a pre-computed relationship value for an initial object, wherein a processor performed one or more computations that are necessary to determine a first relationship between the initial object and a referenced object in a first data format of a first data structure, wherein the pre-computed relationship value is determined based on the first relationship of the initial object to the referenced object, the pre-computed relationship value indicating a second relationship between the initial object and the referenced object in a second data format for a second data structure;

storing the pre-computed relationship value in the object store;

accessing the initial object;

accessing the pre-computed relationship value associated with the initial object; and accessing the referenced object in the second data structure, wherein the referenced object is accessed using the second relationship defined by the pre-computed relationship value, wherein the pre-computed relationship value uniquely identifies the referenced object and allows the referenced object to be directly accessed in the second data format in the second data structure without performing the one or more computations that are necessary to determine the first relationship between the initial object and the referenced object in the first data format.

26. A system for navigating an object store on a mobile device, comprising:

means for calculating a relationship value, the object relationship being calculated by performing one or more computations that are necessary to determine a first relationship between the initial object and a referenced object in a first data format of a first data structure, wherein the object relationship is determined based on the first relationship of the initial object to the referenced object, the object relationship being between the initial object and the referenced object in a second data format for a second data structure;

means for communicating the relationship value to the mobile device;

means for storing the relationship value in the object store;

means for accessing the initial object from the object store; and means for using the relationship value to access the referenced object in the second data structure, wherein the referenced object is accessible on the mobile device using the object relationship, wherein the object relationship uniquely identifies the referenced object and allows the referenced object to be directly accessed in the second data format in the second data structure without performing the one or more computations that are necessary to determine the first relationship between the initial object and the referenced object in the first data format.

* * * * *

UNITED STATES PATENT AND TRADEMARK OFFICE
CERTIFICATE OF CORRECTION

PATENT NO. : 7,047,259 B1  Page 1 of 1
APPLICATION NO. : 10/183144
DATED : May 16, 2006
INVENTOR(S) : Doug Chasman et al.

It is certified that error appears in the above-identified patent and that said Letters Patent is hereby corrected as shown below:

Column 11, line 58, replace "a an" with --an--.

Column 12, line 46, replace "that that" with --that--.

Signed and Sealed this

Seventeenth Day of October, 2006

JON W. DUDAS
*Director of the United States Patent and Trademark Office*